Dec. 28, 1937.   I. R. SMITH   2,103,562
WHEELBARROW MANUFACTURE
Filed May 11, 1934   2 Sheets—Sheet 1
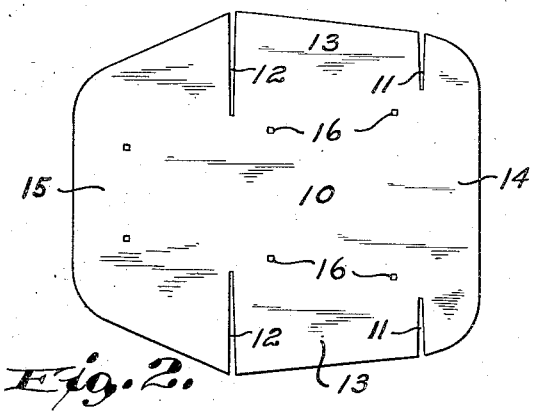
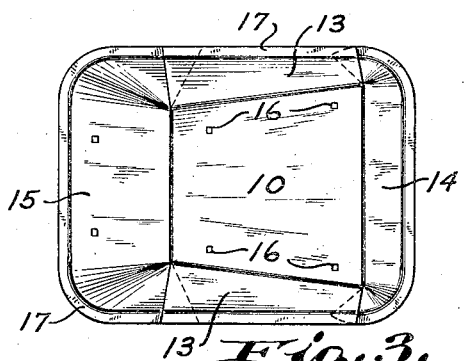
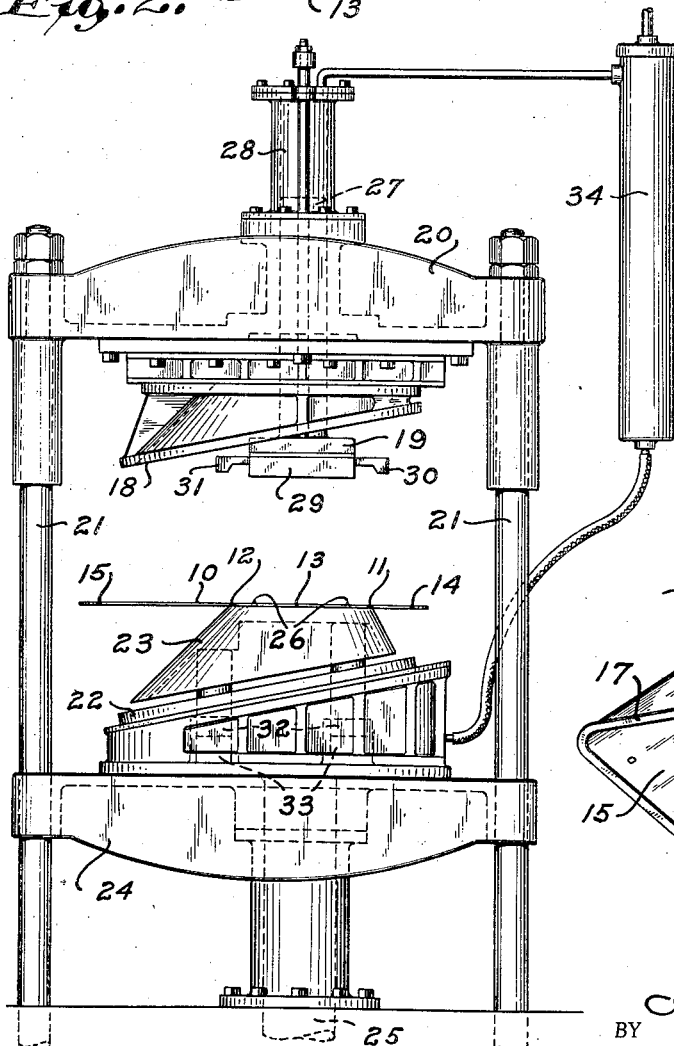
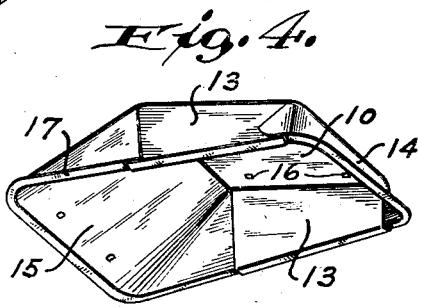
INVENTOR.
I. R. Smith
BY
Morsell, Lieber & Morsell
ATTORNEYS.

Dec. 28, 1937.    I. R. SMITH    2,103,562
WHEELBARROW MANUFACTURE
Filed May 11, 1934    2 Sheets—Sheet 2
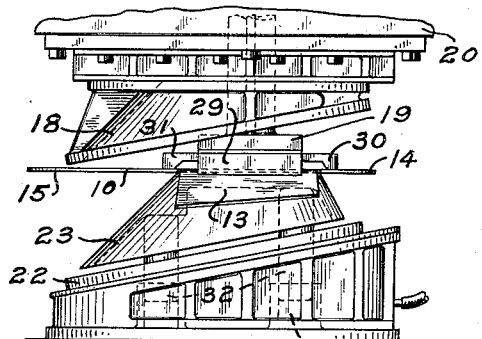
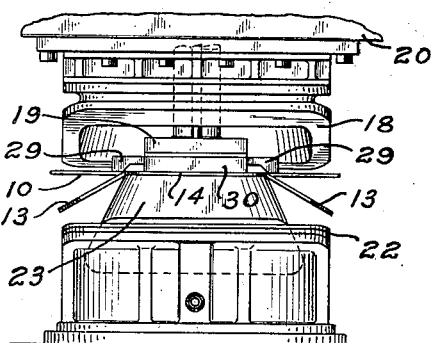
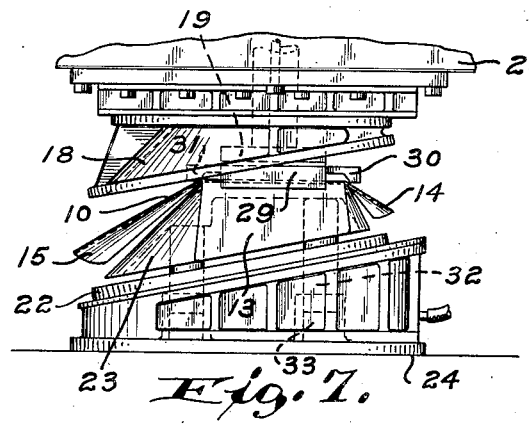
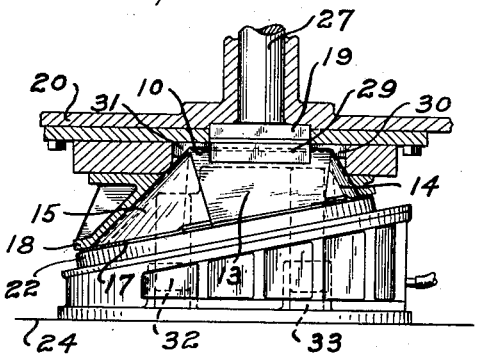
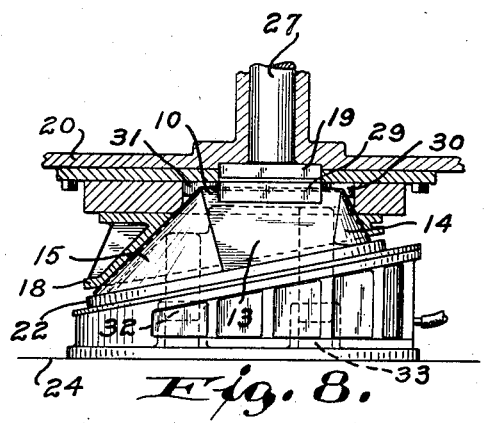
INVENTOR.
I. R. Smith
BY
Morsell, Lieber & Morsell
ATTORNEYS.

Patented Dec. 28, 1937

2,103,562

UNITED STATES PATENT OFFICE 2,103,562

WHEELBARROW MANUFACTURE

Irving R. Smith, Milwaukee, Wis., assignor to Sterling Wheelbarrow Company, West Allis, Wis., a corporation of Wisconsin Application May 11, 1934, Serial No. 725,045

6 Claims. (Cl. 153—21)

The present invention relates in general to improvements in the art of manufacturing wheelbarrows, and relates more specifically to an improved method of and apparatus for constructing improved wheelbarrow bodies.

Generally defined, an object of the invention is to provide improvements in the art of producing metal wheelbarrow bodies, whereby the same may be constructed rapidly, effectively, and at minimum cost.

It has heretofore been common practice to construct metal wheelbarrow bodies by drawing the same with suitable dies, from flat, solid sheets of metal so as to produce seamless final body structures. While this prior method is relatively satisfactory when the bodies are shallow, the metal will not withstand the extreme distortion required in order to produce deep bodies, so that other methods must be resorted to in the construction of the latter. Since the trade demands wheelbarrows having bodies varying in depth from a few inches to more than a foot, it has become quite a problem for the manufacturer to be able to produce the demanded variety of these bodies in uniform styles with the necessary speed, efficiency and at minimum cost.

More specifically stated, the present invention contemplates an improved method of forming metallic wheelbarrow bodies from specially formed blanks which can be rapidly and conveniently distorted to produce uniform final bodies of any desired depth.

Another specific object of the invention is to provide improved apparatus for quickly distorting a succession of sheet metal blanks into similar bodies of great strength and rigidity, without undesirably stressing the metal.

Still another specific object of the invention is to provide an improved sheet metal wheelbarrow body which is durable in construction, and which can be manufactured at minimum cost.

These and other objects and advantages will be apparent from the following detailed description.

A clear conception of the mode of constructing metal wheelbarrow bodies in accordance with the present improvement, may be had by referring to the drawings accompanying and forming a part of the specification in which like reference characters designate the same or similar parts in the various views.

Fig. 1 is a somewhat diagrammatic side elevation of the improved machine for forming sheet metal wheelbarrow bodies, showing a blank initially inserted preparatory to distortion thereof;

Fig. 2 is an enlarged plan view of one of the improved sheet metal blanks prior to distortion thereof;

Fig. 3 is a similarly enlarged top view of the blank after distortion thereof in the machine of Fig. 1, but before final finishing of the marginal rim;

Fig. 4 is a perspective view of one of the pressed sheet metal wheelbarrow bodies, showing the same inverted and in the condition in which the body is received from the press;

Fig. 5 is a fragmentary side view of the pressing dies showing the same in the act of performing the first bending operation;

Fig. 6 is a fragmentary rear end view of the dies likewise showing the same in the act of performing the initial bending operation;

Fig. 7 is a fragmentary side view of the distorting dies showing the same in the act of performing the second bending operation;

Fig. 8 is a fragmentary part sectional view of the dies showing the same in the act of performing the third bending operation; and Fig. 9 is a similar part sectional view of the dies in the act of performing the final bending and flanging operations.

While the invention has been shown and described herein as being utilized to produce metal wheelbarrow bodies of a specific shape and of a definite depth, it is not intended to unnecessarily restrict the scope by such specific disclosure.

Referring to Figs. 2, 3 and 4 of the drawings, it is to be noted that the present invention contemplates formation of the bodies from special blanks 10 each having side slits 11, 12 extending inwardly from the opposite sides thereof to form lateral or side portions 13, a rear portion 14, and a front portion 15. The two side portions 13 are similar, but the front portion 15 is longer than the rear portion 14 in order to provide greater depth and less slope near the forward portion of the completed body, and the medial part of the blank 10 is provided with holes 16 for facilitating final attachment of the completed body to a supporting frame with the aid of bolts or the like. Since the present invention relates more specifically to the general distortion of the blanks 10 into the forms shown in Figs. 3 and 4, the operations of final finishing will not be described herein, but it is to be understood that the flange portions 17 may be finally rolled or otherwise bent around a stiffening wire to provide a rigid final rim, and that the overlapping side and end portions 13, 14, 15 are ordinarily spot welded to each other so as to eliminate gapping.

Referring to the pressing apparatus shown diagrammatically in Fig. 1 and Figs. 5 to 9 inclusive, this apparatus comprises in general an upper normally fixed die 18 having a retractable central plunger 19 therein, both supported by an upper frame 20 carried by fixed guide posts 21; and a lower vertically movable die 22 having a relatively movable central form 23 associated therewith, both of which are supported upon a lower frame 24 slidably cooperating with the posts 21, and which are simultaneously movable by a hydraulic plunger 25. The upper horizontal deck of the form 23 is provided with four upwardly projecting points 26 adapted to engage the central holes 16 in the successive blanks 10 in order to temporarily position and hold the blanks in place, and these blanks are freely insertable in the press when the lower die 22 is in lowermost position as shown in Fig. 1. When hydraulic pressure is applied to the plunger 25, however, the lower die 22 and form 23 are simultaneously elevated to move the blank toward the upper die 18 and plunger 19, as indicated in Figs. 5 to 9 inclusive, thereby pressing the blank 10 into the shape shown in Figs. 3 and 4.

The central plunger 19 is carried by an air actuated piston 27 cooperating with a cylinder 28, this piston 27 being gradually movable from the position shown in Figs. 1 and 5, to the position shown in Figs. 8 and 9, when the lower die 18 is moved upwardly; but this upward movement of the plunger 19 is resisted by the air pressure within the cylinder 28 which always tends to move the plunger downwardly. The plunger 19 has oppositely disposed side members 29 which are adapted to engage and to partially displace the side portions 13 of a blank 10 being moved upwardly by the form 23, before any other portion of this plunger engages the blank; and the rear and front portions of the plunger 19 are provided with rear and front distorting members 30, 31 respectively, which subsequently engage the rear and front blank portions 14, 15 as the press elements are moved upwardly. The central form 23 of the lower die 22 is likewise carried by one or more air pistons 32 cooperating with cylinders 33 carried by the lower frame 24, and these pistons 32 normally hold the form 23 in elevated position relative to the lower die 22 but permit the form to move downwardly a slight distance during the formation of the flange sections 17. The air pressure within the cylinders 28, 33, may be maintained at the desired value by connecting these cylinders with a common pressure chamber 34 communicating with a suitable source of air under pressure.

The improved machine is adapted to produce accurately formed wheelbarrow bodies in rapid succession, and is operable by a single workman. After the blanks 10 have been prepared as shown in Fig. 2, they are insertable in the press in the manner indicated in Fig. 1. When the holes 16 have been engaged by the points 26 to properly position a blank 10, hydraulic pressure may be applied to the plunger 25 to cause the lower die 22 and the lower form 23 to rise simultaneously with the frame 24 with which the plunger 25 cooperates. The first forming operation is caused by the side members 29 of the plunger 19, and when these side members engage the side portions 13 of the blank 10 as shown in Figs. 5 and 6, they initially bend these side portions 13 downwardly toward the form 23. Continued upward movement of the lower die 22 and form 23 causes the plunger 19 to rise and simultaneously causes the plunger members 30, 31 to engage the rear and front portions 14, 15 respectively of the blank. During downward distortion of the rear and front portions 14, 15 of the blank the side edges of these portions are simultaneously bent inwardly toward the side portions 13 of the blank, as shown in Fig. 7. The plunger 19 is eventually elevated to the extreme position as shown in Fig. 8 and during such elevation of the plunger and continued elevation of the form 23, the side edges of the rear and front portions 14, 15 of the blank are bent inwardly so as to overlap the adjacent edges of the side portions 13, thus causing the side and end portions of the blank 10 to snugly coact with the form 23 and with the interior of the upper die 18. When the upward motion of the plunger 19 has been arrested, the lower die 22 continues to move upwardly while the form 23 has been brought to rest, and this continued motion of the lower die 22 causes the edge portion thereof to cooperate with the adjacent edge portion of the fixed upper die 18 so as to produce the flange portions 17. When the formation of the body has been thus completed, the lower die 22 and form 23 may be withdrawn, carrying with them the formed body blank which may be thereafter removed to place the press in condition for a succeeding operation.

From the foregoing description it will be apparent that the invention provides a simple and highly effective method of forming successive wheelbarrow bodies from blanks which have been specially prepared as shown in Fig. 2. The holes 16 besides serving to properly initially position the blanks, also hold the blank in position during the distorting operation. The slits 11, 12 permit the sides and ends of the body to be formed without undesirably stressing the metal, and by permitting the end portions 14, 15 to overlap the side portions 13, the sides of the body structure are reinforced where such reinforcement is most needed. The formation of the flange portions 17 after the sides and ends have been properly formed, serves to maintain the entire structure in its desired shape and insures uniformity in the construction of successive wheelbarrow bodies. The flange portions 17 may be subsequently wrapped about a stiffening wire in a well-known manner, in order to produce the finally finished rim, and as previously indicated, the overlapping portions of the sides and ends of the body may be welded or otherwise secured to each other so as to prevent undesirable gaps. The slits 11, 12 at the sides of the blanks 10 are of limited length so that when the blank is finally distorted, there will be no openings at the lower inner corners thereof, and the improved machine has proven highly successful in actual commercial operation for the production of bodies having various depths. Although the improved method has been shown and described herein as having been applied to wheelbarrow bodies wherein the opposite side portions are initially bent relative to the bottom, and in which the oppositely disposed end portions are subsequently bent and have their edges bent to overlap the previously bent side portions, it will be observed that the operations may be reversed so that the oppositely disposed end portions are first bent and the oppositely disposed side portions are subsequently bent and caused to overlap the end portions.

The present improved process is not restricted to the formation of bodies of any particular type or shape, and the depths of the bodies can be readily varied by merely substituting for the elements shown, dies 18, 22 and forms 23 of appropriate shape. The movability of the plunger 19 and form 23 and the formation of the members 29, 30, 31, are of relative importance in causing the edges of the rear and front portions 14, 15 of the blanks to assume their proper shapes and to properly overlap the side portions 13. This formation of the end walls and the overlapping referred to, are produced by the movement of the plunger within the upper forming die 18, and is effected automatically during the upward movement of the form 23. The several steps are automatically effected in proper sequence and a machine of the type shown is capable under normal conditions of producing several completed bodies per minute.

It should be understood that it is not desired to limit the invention to the exact details of construction of the machine and to the precise steps of the method herein shown and described, for various modifications within the scope of the claims may occur to persons skilled in the art.

It is claimed and desired to secure by Letters Patent:

1. A press comprising, relatively movable dies cooperable to produce a marginal flange on a blank, a form carried by one of said dies and cooperable with the blank, a plunger carried by the other of said dies and cooperable with the blank in opposition to said form to cause bending of portions of the blank about said form, and resilient means for permitting movement of said form and plunger relative to the supporting dies to produce said marginal flange.

2. A press comprising, an upper fixed die having a relatively movable plunger associated therewith, a lower movable die having a relatively movable form associated therewith and cooperable with said plunger to cause bending of portions of a blank about said form, and common means for resiliently restraining the motion of said form and plunger.

3. Apparatus for forming wheelbarrow bodies from blanks having segregated side and end projections, which comprises a movable die, a form having the completed shape of the finished article carried by said die and having surfaces for supporting the blank, a fixed die complementary in shape to the form carried by the movable die, a plunger formed to initially distort the side and end projections of the blank, and means providing for retraction of said plunger to permit cooperation of the movable die with said form and fixed die to form a continuous marginal flange extending along the outer edges of the side and end projections of the initially distorted blank.

4. The method of forming a wheelbarrow body from a blank having a perforated bottom and slits extending away from the bottom to form segregated side and end projections, which comprises, utilizing the bottom perforations to initially position the blank, subsequently bending the side projections out of the plane of the bottom, thereafter likewise bending the end projections and simultaneously folding the opposite edge portions thereof over the adjacent edge portions of the previously bent side projections, and finally reversely bending the outer edges of all of the side and end projections into a common plane to provide a continuous marginal flange having double thickness at the overlapping edge portions.

5. The method of forming a complete wheelbarrow body from a single blank having segregated side and end projections extending away from the bottom, which comprises, supporting the blank at its bottom portion with the side and end projections extending outwardly beyond the support, bending the side projections out of the plane of the bottom while preventing shifting of the latter, subsequently likewise bending the end projections and simultaneously folding the opposite edge portions thereof over the adjacent edge portions of the previously bent side projections, and finally reversely bending the outer edges of all of the side and end projections into a common plane to provide a continuous marginal flange having multiple thickness at the overlapping edge portions.

6. Apparatus for forming wheelbarrow bodies from completed blanks having segregated side and end projections, said apparatus comprising, an upper fixed die having a relatively movable plunger associated therewith, a lower movable die for initially supporting each blank inwardly of the side and end projections thereof and having a relatively movable form associated therewith and cooperable with said plunger to bend said side and end projections about said form, and common means for resiliently restraining the motion of said form and plunger when said dies are producing a flange along the outer edges of said projections.

IRVING R. SMITH.